Aug. 1, 1944.            T. MILLER            2,354,871
ELECTRIC ARC ETCHING ELECTRODE
Filed June 24, 1942
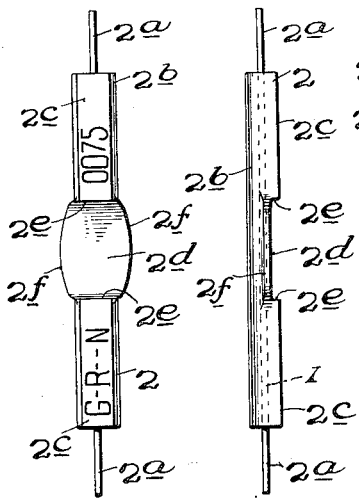
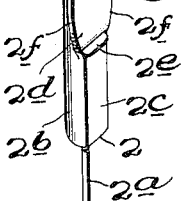
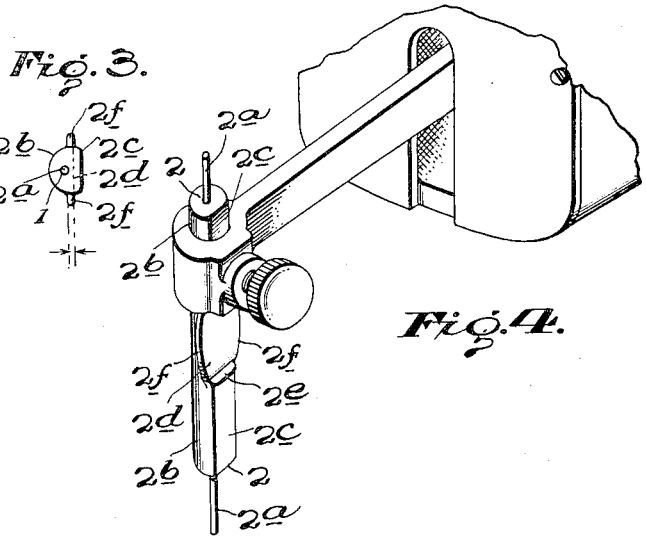
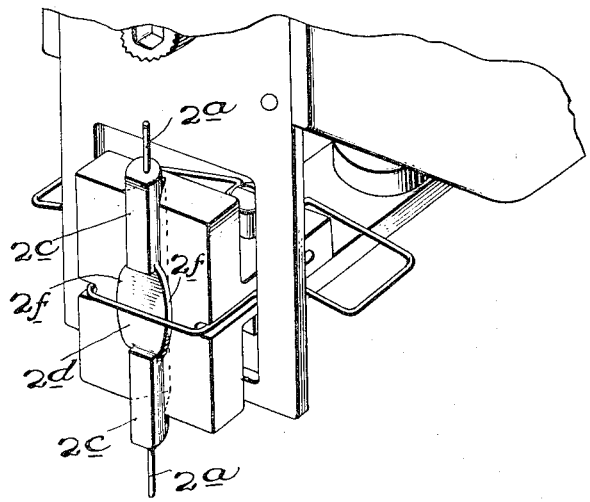
Inventor
Theodore Miller
Peck & Peck
Attorneys Patented Aug. 1, 1944

2,354,871

UNITED STATES PATENT OFFICE 2,354,871

ELECTRIC ARC ETCHING ELECTRODE

Theodore Miller, Racine, Wis., assignor to George Gorton Machine Co., Racine, Wis., a corporation of Wisconsin Application June 24, 1942, Serial No. 448,320

8 Claims. (Cl. 219—14)

This invention concerns electric arc etching electrodes; and the objects and nature of the invention will be apparent to those skilled in the art in the light of the following descriptions of the accompanying drawing illustrating a preferred mechanical expression or example embodiment of my electrode.

This invention concerns the art of electric arc etching, wherein permanent visible marks, such as identification letters, numerals, or other indicia are produced in or on the usually smooth or polished surface of the work by minute electrical arcs rapidly established and extinguished between the work surface and a rapidly oscillating electrode wire where the electrode and said surface are both included in a usually alternating etching circuit, with lateral horizontal movements between the work surface and the vibrating electrode, usually by lateral horizontal movements over the work surface.

The marking of the work surface is produced by the high temperature arcs which by decomposition or vaporization of metals produce minute craters or pits in the work surface. To form lines, the relative lateral movements of the electrode over the work surface is preferably at such a speed that these craters more or less slightly overlap. The width of such etched lines are substantially determined by the diameter or cross sectional dimensions of the electrode wire, hence it is desirable that the consumable electrode wire be of uniform diameter or cross sectional dimensions throughout its consumable length.

This replaceable consumable electrode wire length is carried and longitudinally oscillated by a power driven oscillatory electrode holder from which the wire length depends toward the work surface, so that the end surface of such wire is more or less forcibly brought into contact with the work surface on each oscillation cycle. Hence, I prefer to provide the electrode wire length with a squarely severed flat end contact surface or a blunt end surface to aid in the production of a succession of etched craters or spots on the work of substantially uniform diameters. Also, such peculiarities inherent in this specific etching art, require an electrode wire of high-melting point and of such structure or internal formation as to resist splitting, splaying or upsetting at its work-surface contacting end during high speed work-surface striking oscillations. I have also found it to be desirable to provide each electrode with the greatest possible length of consumable wire, to increase the useful life of the electrode.

An object of the instant invention is to provide an improved electric arc etching electrode that will satisfy the hereinbefore described peculiarities and requirements of said electric arc etching art, and that can be successfully employed therein to efficiently perform the peculiar etching functions described.

A further object of the invention is to provide an improved replaceable consumable electric arc electrode that can be interchangeably and successfully employed in different electric arc etchers now in use.

With the foregoing and other objects, developed by the following description in view, my invention consists in certain novel features of structure, element formation, and combination, as more fully hereinafter explained, and specified by the appended claims.

Referring to the accompanying drawing, forming a part hereof—

Fig. 1 shows an example electrode of the instant invention in front elevation, enlarged, say, four to one.

Fig. 2 is an enlarged edge elevation of said electrode.

Fig. 3 shows said electrode in enlarged end elevation.

Fig. 4 is a detail enlarged perspective view of a portion of the oscillatory electrode holder, of a type of electric arc etcher now in commercial use, showing the instant electrode enlarged and extending through the vertical tubular socket in the free end of said holder and limited in its upward movement therein by the engagement of the midway lateral enlargements of the electrode with the lower end surface of the holder end, the electrode being removably clamped to the holder end by a headed screw, the inner end of which abuts the upper side flat of the electrode.

Fig. 5 is a detail enlarged perspective view of the portion of the oscillatory electrode holder of another type of electric arc etcher now in commercial use, showing the instant electrode enlarged, and operatively and removably applied to the free end head of said holder, as more fully explained hereinafter.

The instant example embodiment of an electrode of my inventive concept, consists of a longitudinally-elongated tubular body or shank 2, of copper, or other good electrical conductor metal sufficiently soft when cold to flow laterally under compressing lateral pressure such as necessary in transversely shaping said shank by a dieing operation.

A suitable straight continuous length of tenuous electrode wire 1, extends longitudinally throughout the length of said tubular shank with the opposite uncovered consumable wire ends 2a, projecting longitudinally in opposite directions from the shank ends, where it is preferred to provide a reversible or double end electrode, of increased useful life, instead of an electrode with the exposed consumable wire projecting from one end only of the electrode.

From a practical use standpoint there is an approximate limitation to the length of the uncovered consumable free end wire projecting from the shank end, dependent to a certain extent on the diameter and stiffness of the electrode wire employed. Thus, if this single free end consumable wire length approximates the aggregate length of the two free ends 2a, of the double-end reversible electrode, such long consumable single wire end, by reason of its overlength would not be sufficiently stiff or stable against lateral buckling or deflection, for satisfactory arc etching purposes.

The reversible or double end electrode, provides relatively short straight uncovered consumable wire ends, that are sufficiently stable laterally by reason of their short lengths to satisfactorily stand up against objectionable buckling, in the specified arc etching method.

The double end reversible electrode is replaceably secured to the oscillatory electrode holder, with one wire end in operative relation to the work surface, and is thus employed for etching until said wire end is consumed. The electrode is then released from its holder, and again applied thereto in the reversed position, with the other unconsumed wire end in operative position over the work surface.

I do not, however, wish to limit all features of my invention to the reversible or double end electrode.

The electrode wire 1, is by the tubular shank 2, held straight and against lateral deflection throughout that portion of its length within said tube, and said wire is rigidly clinched and clamped to said tube against relative longitudinal movements, by transversely compressing and laterally shaping the tube length preferably by the use of opposing dies under pressure.

The peculiar conditions and requirements encountered in this specific arc etching art set up certain limitations with respect to electrodes that can be successfully and efficiently used for such etching operations. Many of these electrode requirements and limitations have been hereinbefore described. The electrode wire is preferably composed of any suitable hard high melting point metal or alloys of good electrical conductivity. For instance, tungsten, or tungsten group metal or alloys, can be employed, although I do not desire to so limit the instant invention. Cylindrical wire is preferred, and the diameter of such wire to be employed is determined, in part, by the diameter of the desired spots or marks to be etched on the work. The wire selected for the electrode in the instant example embodiment, is of such character as to provide blunt contact ends substantially of the diameter of the wire to aid in predetermining the diameter of the etched spots, and to constantly tend to maintain such ends against deformation by upsetting, splaying or otherwise. A certain relatively small degree of lateral springing or flexibility of the free consumable electrode wire end is not objectionable in this peculiar art, but as hereinbefore explained the wire should be sturdy against undue buckling or doubling.

So-called tungsten wire of commerce has been employed by me in the electrodes of the instant invention, and such electrodes have been very satisfactorily employed in practical commercial electric arc etching. Certain tungsten wires suitable for my electrode wire purposes, are available from the manufacturers in various "grain sizes." Such wires are graded according to the sizes of the grains making up or included in the wire formation or structure. The wires made up of the smaller or finer grain sizes are best suited for my electrode wire purposes, as such fine grain wires will stand up against upsetting, splaying and the like under the lateral and longitudinal impacts, pressures, and stresses to which the electrode wires are subjected in practical use.

I have employed such fine grain tungsten wire in the electrodes of my instant invention, successfully in electric arc etching, where such wires were, each cylindrical and of diameters, on the order of .0075", and .010", and .015", respectively. However, these are merely example diameter sizes, without limitations thereto, as other wire diameters have been employed, depending on current densities and etching conditions.

Merely as examples, without limitation, I have successfully employed reversible electrodes, among others of the instant invention, where the tungsten electrode wire was on the order of .0075" diameter, and the shank for said wire was composed of a straight length of cylindrical capillary copper tubing having an original internal diameter on the order of .012", and an exterior diameter on the order of .076"; and where the tungsten wire was on the order of .010" diameter, its copper tube shank was on the order of .020" internal diameter; and where the tungsten wire was on the order of .015" diameter, the copper tube surrounding the same was on the order of .025" internal diameter. Without intending to so limit the invention, the copper tube shanks of these just mentioned completed example electrodes, in length were on the order of eleven-sixteenths of an inch, and the opposite-end consumable projecting electrode wire ends 2a, of each electrode were preferably alike in length, with such length being on the order of from six sixty-fourths to twelve sixty-fourths of an inch depending on the diameters of the electrode wires employed, the larger the wire diameter the longer the wire length 2a.

The completed electrode of the disclosed example embodiment of the invention, consists of the tubular straight shank 2, through which the electrode wire 1, extends longitudinally and approximately centrally with its opposite ends 2a, projecting longitudinally from the shank ends.

This shank is so formed that one side thereof is straight, smooth, and partially cylindrical throughout the length of the shank, as indicated at 2b. This partially cylindrical side 2b, is preferably concentric with the straight wire located therein, and preferably extends through slightly less than one hundred and eighty degrees around the shank. The opposite longitudinal side of said shank is preferably flat throughout its length and of a width, slightly greater than half the diameter of the tube, and provides a pair of longitudinal flats 2c, for the reception of visual indicia such as marks to identify the maker and the diameter of the particular electrode wire. Also, a longitudinally extending relatively deep cross groove 2d, is interposed between the flats 2c, with its opposite ends terminating at more or less abrupt cross edges forming parallel stop walls 2e. The depressed longitudinal flat or floor of this groove 2d, is flat and parallel with the flats 2c, but is depressed with respect to said flats, and the longitudinal planes of the flats and said groove floor are parallel with the longitudinal axis of the electrode wire within the shank, but said floor and the flats are laterally remote from said wire.

The operation of shaping the shank by radially applied pressure forces the metal thereof to reduce the internal diameter of the copper tube and tightly grip and clinch the electrode wire throughout the length thereof. Such shaping action in forming the relatively deep groove 2d, forces the metal of the shank to flow outwardly at the opposite ends of said groove and form the opposite side exterior longitudinally extending projecting bulges or lips 2f, that not only stiffen the shank but also form stops, as hereinafter explained.

By reason of this formation, the instant example replaceable electrode can be successfully used interchangeably on several different electric arc etchers now in commercial use.

There is one type of etcher now in use, wherein the oscillatory electrode holder is provided with a vertical tubular electrode socket open at both ends and between its ends provided with a radial screw threaded into the socket for clamping the electrode fixedly to the holder. The instant electrode, when said clamp screw is partially unscrewed from the socket, can be slipped upwardly into said socket through the open lower end thereof, until the stop-forming lateral enlargement or lips 2f, engage the lower end of the socket. The electrode is then secured by manipulation of said screw, to seat its inner end against one of the flats 2c. When the electrode is employed in this etcher, the lateral enlargement 2f, prevents the socket from sliding down the electrode and striking and possibly injuring the work surface, in the event that the electrode clamping screw works loose by reason of vibration or otherwise. With this etcher, the electrode should be inserted into the holder socket, with the flats 2c, in alinement with the screw to provide a flat face to receive the screw end.

Another type of electric arc etcher now in use, provides the free end of its oscillatory electrode holder arm with a head rigid therewith. The front side of this head provides a vertical electrode-receiving V-groove open at both ends and at its outer longitudinal side, constituting a slideway for a relatively longitudinally movable replaceable electrode. The electrode is removably held to this groove for limited longitudinal sliding movements, by a light spring wire length having a cross portion in front of said head and the electrode and transversely spanning the electrode to lightly retain the same to the head and in the groove, and permit the electrode to relatively longitudinally slide downward when the downward movement of said holder is suddenly halted.

My instant replaceable electrode can be applied to this just mentioned head by pulling the cross portion of the spring wire outwardly and inserting the electrode endwise thereunder with the cylindrical back side of the electrode sliding down along the two laterally-spaced longitudinal front edges of the V-groove. The cross portion of the retaining spring can then be released to fit across the depressed floor or flat 2d, between the top and bottom cross stop walls 2e, and thus lightly hold the electrode against said spaced longitudinal edge walls, for relative longitudinal sliding movements limited by the engagement of said stop walls 2e, with the cross portion of the retaining spring.

What I claim is:

1. An electric arc etching electrode for replaceable use in the vibratory electrode holder of an electric arc etching machine, said electrode consisting of a tubular relatively soft metal shank, and a tenuous high melting-point hard metal arc etching electrode wire of uniform cross sectional dimensions throughout its length, said wire extending longitudinally through said shank in current conducting relation thereto and providing relatively uncovered consumable ends projecting longitudinally from the opposite shank ends, said wire ends providing blunt end faces, said shank throughout its length rigidly gripping and holding the portion of the wire located therein.

2. A replaceable electric arc etching electrode for use in electric arc etching machines, consisting of a relatively short soft metal tubular shank, and a relatively long, straight length of cylindrical tenuous tungsten wire extending longitudinally through and projecting longitudinally from said shank and tightly grasped thereby in current conducting relation, to provide an uncovered straight consumable arcing free end length having a substantial blunt end face.

3. An electric arc etching electrode for replaceable use in the vibratory electrode holder of an arc etching machine, said electrode consisting of a relatively long straight length of fine-grained tungsten wire, substantially as described, and a relatively short straight capillary tube of relatively soft metal through which said wire extends, said tube rigidly gripping and supporting said wire in current conducting relation, said wire projecting longitudinally from said tube and providing a straight uncovered consumable free end arcing length of said wire.

4. A replaceable electric arc etching electrode for interchangeable use in different electric arc etching machines, the vibratory electrode holders of which employ either an electrode-receiving open-end socket and means for temporarily fixedly securing the electrode thereto, or a longitudinal open-side slideway for the electrode and means for temporarily and loosely confining the electrode therein for limited longitudinal sliding movements; said electrode comprising a relatively long straight length of consumable tenuous electric arc-etching electrode wire of substantially uniform cross sectional dimension throughout its length and composed of relatively high-melting point hard metal, and a relatively short straight length of capillary tubing of relatively soft metal through which said wire longitudinally extends and from which it longitudinally projects, said tube being rigidly compressed on said wire with the tube and wire in current conducting relation; said tube being endwise insertible into said open-end socket and providing stop means to limit said inserting movement, said tube throughout the length of one straight side being formed to fit said slideway in longitudinal sliding engagement, the opposite side of said tube providing a transverse flat and stop means for limiting the longitudinal sliding movement of the electrode in said slideway.

5. A reversible replaceable electric arc etching electrode consisting of a relatively long straight length of consumable tenuous electric arc etching electrode wire of relatively high melting point hard metal, and a relatively short straight capillary tube of relatively soft metal through which said wire longitudinally extends with its straight consumable uncovered opposite ends projecting longitudinally in opposite directions from the tube ends, said tube rigidly gripping said wire, said tube having a substantially flat side providing lateral rigid stop means, the tube being otherwise of external partial approximately cylindrical formation throughout its length, for the purposes substantially as described.

6. A replaceable electric arc etching electrode for the vibratory electrode holder of an electric arc etching machine, said electrode consisting of a relatively long straight length of consumable tenuous electric arc etching electrode wire of substantially uniform cross section throughout its length and of relatively hard high-melting point metal, and a relatively short capillary tube of relatively soft metal through which said wire extends and from which a straight substantial length of uncovered consumable wire longitudinally projects, said tube rigidly gripping and supporting the wire located therein in current conducting relation, said tube having opposite side laterally projecting stop forming lips integral with said tube, and a depressed flat extending across said tube and said lips and providing transverse stop shoulders between which said flat is located.

7. An electric arc etching electrode for the use described, comprising a straight elongated length of electrode wire of hard high-melting point metal; and a longitudinal tubular shank through which said wire extends and from which it projects, said shank composed of relatively-soft-metal tubing compressed on and clinching said wire, one side of said tubing having flats including a cross groove with a depressed floor bounded by stop shoulders, said tube having lateral projecting stop portions at the ends of said groove, said tube being otherwise substantially cylindrical throughout its length.

8. An electric arc etching electrode comprising a relatively long length of tenuous electrode hard high melting point wire, and a relatively short length of straight cylindrical soft metal tubing through which said wire extends and from which it projects, said tubing having a cross groove radially compressed therein with the metal of the tubing flowed laterally at the ends of the groove and providing the tubing with exterior lips, said groove having edge stop walls extending transversely across said tubing.

THEODORE MILLER.